United States Patent [19]

Kobelt

[11] Patent Number: 4,592,526
[45] Date of Patent: Jun. 3, 1986

[54] ADJUSTABLE HOLDING DEVICE

[76] Inventor: Jacob Kobelt, 6110 Oak Street, Vancouver, British Columbia, Canada, V6M 2W2

[21] Appl. No.: 723,729

[22] Filed: Apr. 18, 1985

Related U.S. Application Data

[63] Continuation-in-part of Ser. No. 295,624, Aug. 24, 1981, abandoned.

[51] Int. Cl.$^4$ ............................................. A47G 29/00
[52] U.S. Cl. ..................................... 248/278; 248/279
[58] Field of Search ............... 248/278, 103, 279, 916, 248/903, 544, 546, 300, 124, 296, 282, 284

[56] References Cited

U.S. PATENT DOCUMENTS

| | | | |
|---|---|---|---|
| 289,180 | 11/1883 | Tregurtha | 248/279 |
| 432,883 | 7/1890 | Lebenberg | 248/279 |
| 958,440 | 5/1910 | Sackman | 248/278 |
| 992,756 | 5/1911 | Cross | 248/278 |
| 1,114,948 | 10/1914 | Walker | 248/278 X |
| 1,164,358 | 12/1915 | Kaufmann | 248/278 X |
| 1,266,367 | 5/1918 | Wilson | 248/284 |
| 1,666,341 | 4/1928 | Nagin | 248/300 |
| 1,693,925 | 12/1928 | Holt | 248/278 X |
| 1,741,937 | 12/1929 | Hill | 248/103 |
| 1,745,695 | 2/1930 | Hunter | 248/279 |
| 1,840,768 | 1/1932 | Doane | 248/278 |
| 2,220,429 | 11/1940 | Soderberg | 248/279 X |
| 2,605,069 | 7/1952 | Gillaspy | 248/103 |
| 3,565,382 | 2/1971 | Passarelli | 248/300 |
| 3,889,908 | 6/1975 | Larson | 248/278 |
| 3,913,876 | 10/1975 | McSherry | 248/903 |
| 4,005,942 | 2/1977 | Gilb | 248/903 |

FOREIGN PATENT DOCUMENTS 521816 7/1921 France .............................. 248/284

Primary Examiner—J. Franklin Foss
Assistant Examiner—Robert A. Olson
Attorney, Agent, or Firm—Shlesinger, Arkwright, Garvey & Fado

[57] ABSTRACT

Adjustable holding device for holding an item in a desired location relative to a surface, for example it can be used in a marine control system for holding an end of an outer sheath of a control cable adjacent a throttle control. To avoid the excessive number of brackets commonly required for holding items such as control cables, housings, and other light-weight accessories relative to an engine crankcase, gearbox, etc., the present invention provides a holding device that is universally adjustable in three planes to permit simple attachment to the crank case or gearbox with one portion of the device, and easy attachment at an opposite end to the item to be located. The device has inner and outer brackets for securing to the surface and to the item itself, with first, second and third members extending between the brackets. Lockable hinges connect adjacent members and brackets together rigidly, and yet provide adjustment to permit a wide range of inclination of the items.

8 Claims, 6 Drawing Figures

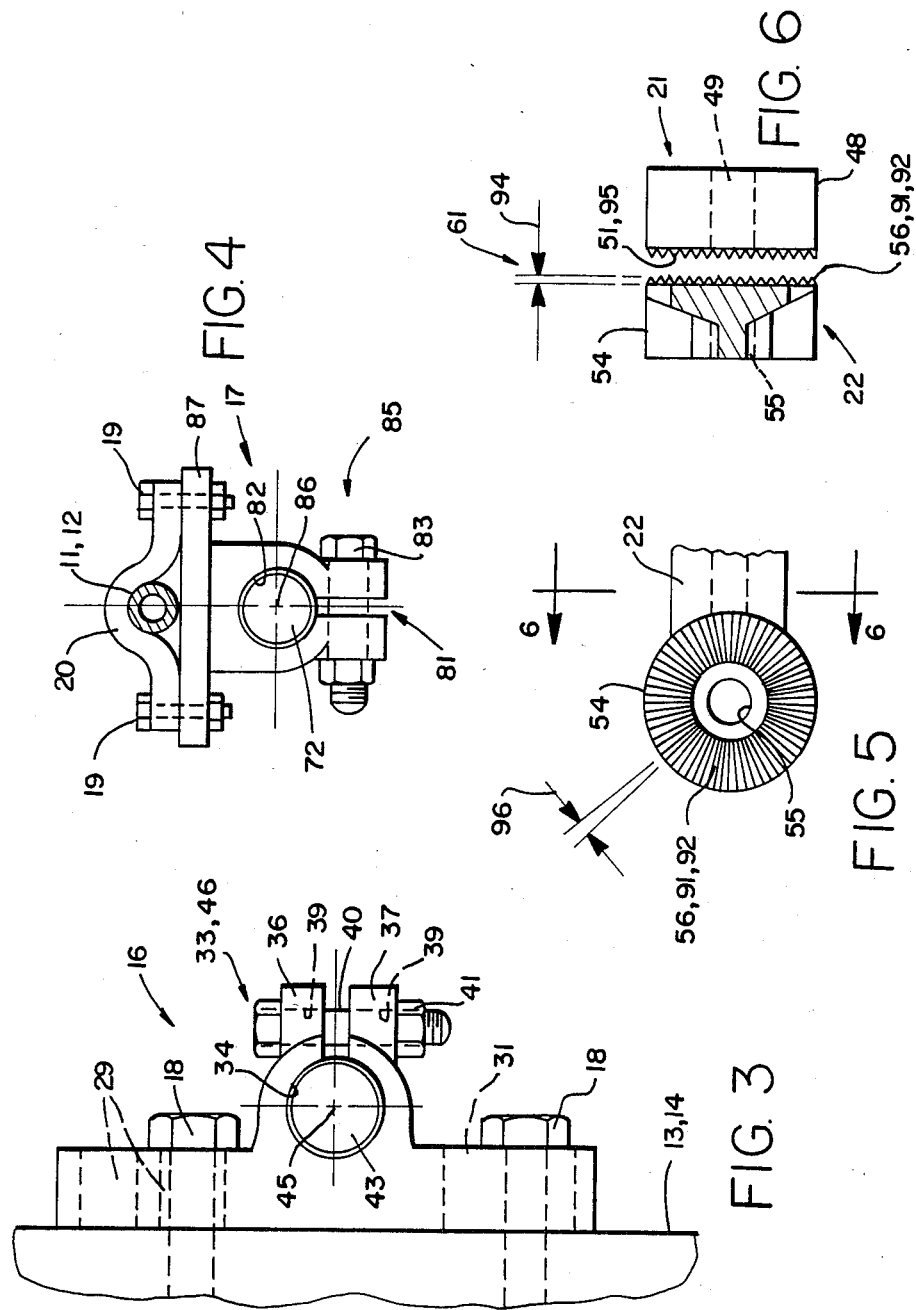

ADJUSTABLE HOLDING DEVICE

This application is a continuation-in-part of application Ser. No. 295,624, filed 8/24/81.

BACKGROUND OF THE INVENTION

1. Field of the Invention

The invention relates to an adjustable holding device for holding an item in a desired location relative to a surface, and is particularly adapted for, but not limited to, marine control applications for locating accessories, control cables, etc. relative to engine, gearbox components, etc.

2. Prior Art

There is a wide variety of engine and gearbox combinations fitted in marine vessels, road vehicles, etc., and there is a correspondingly wide variation of control system linkages and accessories for use with these combinations, most of which require a positive location relative to a fixed surface. Usually a bracket supplied by the manufacturer is required to locate a particular item relative to a particular model of engine or gearbox, and if there is any change in the item, or if there is interference with adjacent structure, the bracket supplied is unsuitable and a custom made bracket is required. If additional accessories are added later, often this custom made bracket itself becomes unsuitable and a second custom made bracket is required. Fabricating brackets on an "ad hoc" basis as above is time consuming and expensive, and results mainly from the fact that most brackets are not easily adjustable to accomodate nonstandard combinations.

Manufacturers have attempted to keep pace with the ever increasing variety of accessories and control systems by providing many brackets for specific purposes. Some major manufacturers supply hundreds of different types of brackets for specific applications and the supplying and stocking of such brackets is expensive and time consuming. The Morse Controls Division of North American Rockwell, in its 1971 catalogue, at pages 168-192, lists well in excess of 100 cable-to-engine connection kits. Certainly, many more have been required and developed since that catalogue was published. Furthermore, it is not unusual for a bracket supplied for a specific purpose to be inappropriate due to a non-standard combination of adjacent equipment or accessories. Consequently, it can be appreciated that there has been a long felt but, until now, unfilled need for a single device capable of effectively replacing the prior hundreds of custom holding devices. Only the invention disclosed herein has been able to provide a holding device capable of replacing the prior custom made devices and also capable of being reconfigured after initial installation.

SUMMARY OF THE INVENTION

The invention reduces difficulties and disadvantages of the prior art by providing an elongated adjustable holding device which has one end which can be secured to a surface of a fixed member, for example an engine crankcase or gearbox, and has an opposite end to which the item can be attached, for example the sheath of a control cable or other accessory. The device has several portions which are interconnected through adjustable and lockable hinge means, which provide rotations in more than one plane to accomodate a wide variety of relative inclinations of the item to be held. This invention could eliminate some hundreds of brackets presently available for specific applications by stocking only one or a few such holding devices. Furthermore, because the device can be adjusted with simple tools without metal cutting, it can usually be adjusted to accomodate later changes in the arrangement of the adjacent equipment. Furthermore, additional portions of similar brackets can be added to a basic device to carry more than one item if required.

An adjustable holding device according to the invention is for holding an item in a desired location relative to a surface. The device has inner and outer brackets and first, second, third and fourth members interconnected as follows.

The inner bracket has fastener means for securing to the surface. The bracket has a portion of a lockable first hinge means having a first hinge axis of rotation disposed normally to longitudinal axes of the fastener means. The first member has adjacent one end thereof a complementary portion of the first hinge means for locking relative to the bracket, the first member having a longitudinal axis coincident with the first hinge axis. The first hinge means permits rotation of the first member relative to the inner bracket through a complete revolution. The first member also has adjacent an opposite end thereof a portion of a lockable second hinge means which has a second hinge axis disposed normally to and intersecting the first hinge axis of rotation. The second member has adjacent one end thereof a complementary portion of the second hinge means for locking relative to the first member, the second member also having adjacent an opposite end thereof a portion of a lockable third hinge means. The third member has adjacent one end thereof a complementary portion of the third hinge means for locking relative to the second member, the third member also having adjacent an opposite end thereof a portion of a lockable fourth hinge means. The fourth member has adjacent one end thereof a complementary portion of the fourth hinge means for locking relative to the third member. The fourth member also has adjacent an opposite end thereof a portion of a lockable fifth hinge means, the fifth hinge means having a fifth hinge axis of rotation disposed normally to and intersecting an axis of rotation of the fourth hinge means, the fourth member also having a longitudinal axis coincident with the fifth hinge axis. The outer bracket is for securing to the item and has a complementary portion of the fifth hinge means for locking relative to the fourth member. The fifth hinge means permits rotation of the outer bracket relative to the fourth member through a complete revolution. The second, third and fourth hinge means have respective hinge axis which are disposed parallel to each other.

A detailed disclosure following, related to drawings, describes a preferred embodiment of the invention which is capable of expression in structure other than the particularly described and illustrated.

DESCRIPTION OF THE DRAWINGS

FIG. 3 is a simplified elevation as seen from line 3—3 of FIG. 1 showing only a portion of an inner bracket and clamping means thereof, FIG. 4 is a simplified elevation as seen from line 4—4 of FIG. 1 showing only a portion of an outer bracket thereof, FIG. 5 is a simplified section on line 5—5 of FIG. 2 showing one engaging means of a portion of a hinge, and FIG. 6 is a simplified section on line 6—6 of FIG. 5 showing both portions of a hinge and associated engaging means.

DETAILED DISCLOSURE

FIGS. 1 through 4

Figure 1:
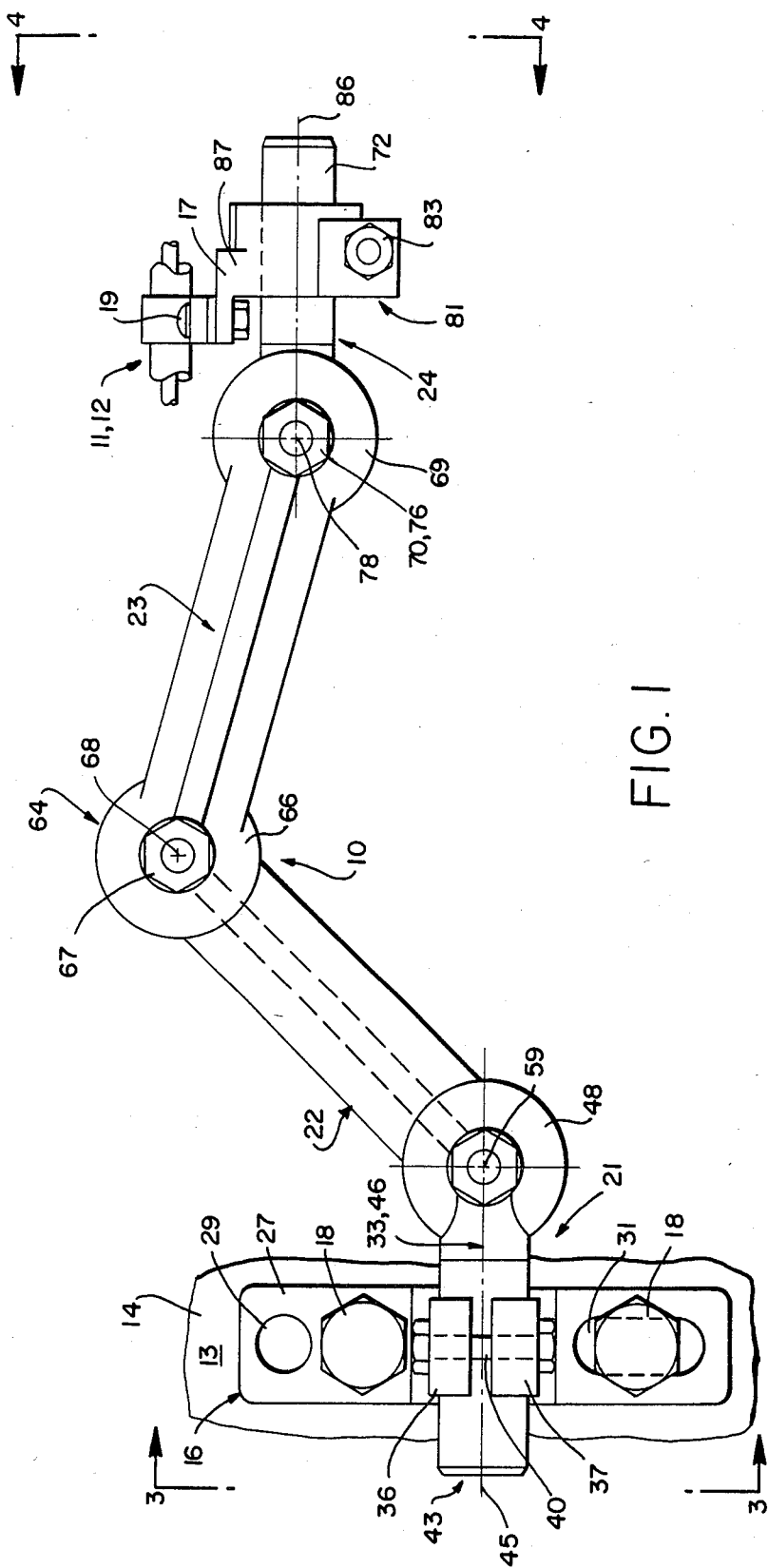
FIG. 1 is a simplified side elevation of a device according to the invention shown secured to a surface at one end thereof, and to a portion of an item at an opposite end thereof.

An adjustable holding device 10 according to the invention holds an item 11, for example a sheath of a control cable 12, in a desired location relative to a surface 13 of an engine crankcase 14. The device 10 has inner and outer brackets 16 and 17 bolted with respective bolts 18 and 19 to the surface 13, and to a clamp 20 around the cable sheath 12, respectively. For clarity, the clamp 20, the sheath 12 and bolts 19 are not shown in FIG. 2. The device also has first, second, third and fourth members designated 21, 22, 23 and 24 respectively, in which the first and fourth members are generally similar to each other, and the second and third members are generally similar to each other as will be described.

The inner bracket 16 has a securing portion or flange 27 having fastener openings 29 at one end to receive one of the bolts 18, and an oval slot or fastener opening 31 at an opposite end to receive one of the bolts 18 to permit adjustment to accomodate openings in the surface 13. As seen in FIG. 3, the inner bracket has a pinch bolt clamping means or structure 33 having an opening 34 defined by oppositely facing arcuate clamping portions 36 and 37 having aligned openings 39 to receive a pinch bolt 40 secured by nut 41, although those skilled in the art will realize that nut 41 is not necessary, it merely being necessary that portions 36 and 37 be maintained by bolt 40 in the clamped shaft engaging position. The first member 21 has a shaft 43 having a circular cross section which is complementary to the opening 34 of the clamping structure 33 so that the opening 34 receives the shaft of the first portion 21 and the pinch bolt 40 and nut 41 can be used to reduce the effective diameter of the opening 34 to hold the shaft 43 therein. With the pinch bolt loosened, the shaft 43 can be rotated relative to the inner bracket, and thus serves as a first hinge means 46 having a first hinge axis 45 of rotation. Thus, the pinch bolt clamping structure 33 serves as a portion of a lockable first hinge means 46, and the shaft 43 serves as a complementary portion of the first hinge means which can be locked relative to the inner bracket 16. Thus the first member 21 has a longitudinal axis coincident with the first axis 45 of rotation of the first hinge means to permit rotation of the first member relative to the inner bracket. The first member also has an outer end having a boss 48 with a cylindrical opening 49 disposed centrally of the boss, the boss having an annular face 51 having engaging means thereon which are described in greater detail with reference to FIGS. 5 and 6.

Figure 2:
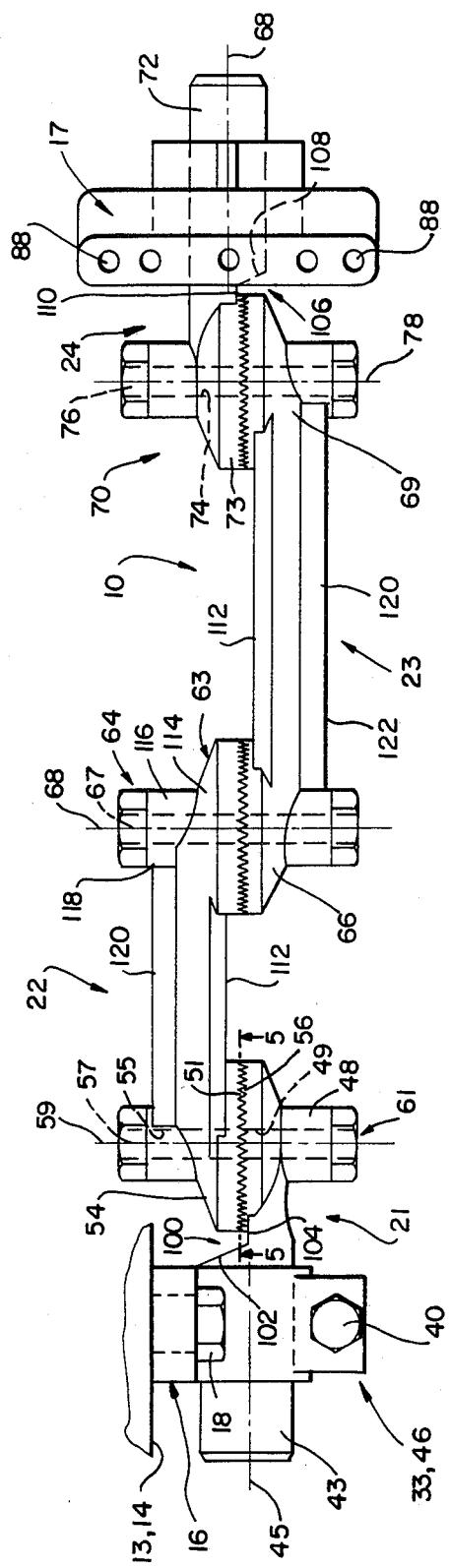
FIG. 2 is a simplified top plan of the device of FIG. 1.

As best shown in FIG. 2, first member 21 has a recess 100 proximate boss 48 and having a depth substantially one-half the diameter of shaft 43. The recess 100 has angled wall portion 102 terminating in floor portion 104. In this way, shaft 43 may have a large diameter which provides thereby maximum circumference to facilitate and maintain locking engagement of the periphery of shaft 43 with portions 36 and 37.

Maximum locking engagement between shaft 43 and bracket 16 is necessary because of the need to maintain cable 12 in its preset position. The cable 12 is, generally, subject to high pulling loads which generate substantial torgue which must be resisted if the cable 12 is to perform its required functions. Failure to resist the high torgue loads could permit the shaft 43 to rotate. This tendency to rotation must be completely resisted for safe use of the holding device 10 with the cable 12. Similar lock conditions apply to the interconnection of the other members, as will be further explained.

The components of the device 12 are, preferably, manufactured from naval bronze, or other similar material, which materials have a relatively low coefficient of friction. Consequently, maximum gripping area is necessary in order to generate sufficient resistance to the applied torgue.

The second member 22 has a similar boss 54, as best shown in FIG. 5, and has a similar cylindrical opening 55 disposed centrally thereof adjacent an inner end of the second member, the boss 54 having a similar annular face 56 and complementary engaging means as will be described. A nut and bolt assembly 57, as best shown in FIG. 2, passes through the aligned openings 49 and 55 and clamps the outer end of the first member 21 to the inner end of the second member 22, the engaging means of the adjacent faces 51 and 56 preventing rotation between the members 21 and 22 when sufficient clamping force is applied by nut and bolt assembly 57. By loosening the nut and bolt assembly 57, the members 21 and 22 can be rotated relative to each other, and can be seen to form a portion of a second hinge means 61 having a second hinge axis 59. Thus, the second member 22 has a complementary portion of the second hinge means for locking relative to the first member 21. As best seen in FIG. 2, the second hinge axis 59 is disposed normally to the first hinge axis 45.

The second member has at an outer end thereof a boss 63 which is a portion of a lockable third hinge means 64 which is generally similar to the respective portion of the second hinge means. A solid link is integral with bosses 63 and 54 and permits the bosses to be connected and to thereby provide member 22. Member 23 is substantially identical thereto, as will be explained and as can be seen from the drawings. The third member 23 has a similar boss 66 which is a complementary portion of the third hinge means for locking relative to the second member similarly to the second hinge means. The third hinge means 64 has a bolt assembly 67 and a third hinge axis 68 which is parallel to the second hinge axis 59. The member 23 also has at an outer end thereof a boss 69 which is a portion of a lockable fourth hinge means 70 having similar engaging means. As previously stated, the fourth member 24 is generally similar to the first member 21 and has a cylindrical shaft 72 extending from a boss 73, the boss 73 having a central opening 74 therein to receive a bolt assembly 76 to form a complementary portion of the fourth hinge means 70. The fourth hinge means 70 is lockable relative to the third member by the bolt assembly 76 and has a fourth hinge axis 78 parallel to the second and third axes of rotation.

The outer bracket 17 has a pinch bolt structure 81 generally similar to the pinch bolt structure 33 of the inner bracket and has an opening 82 complementary to the shaft 72 and a pinch bolt 83 to clamp the structure to the shaft. As explained for shaft 43, shaft 72 has maximum diameter in order to provide maximum locking with pinch bolt structure 81 so to resist the pulling force applied to cable 12. Shaft 72, as best shown in FIG. 2, has recess 106 with wall portion 108 terminating in floor portion 110. The bosses 63 and 69, as well as bosses 48 and 54, are spaced from the wall portions 108 and 102, respectively, to permit ease in assembly of device 10. Preferably, shaft 72 has a diameter equal to the diameter of shaft 43 in order to maximize the strength of device 10. Thus, it can be seen that the outer bracket 17 can be rotated about the shaft 72, which shaft and pinch bolt structure thus serve as a complementary portions of a lockable fifth hinge means 85 having a fifth hinge axis 86 which can be locked relative to the fourth member. The fourth member has a longitudinal axis coincident with the fifth hinge axis to permit rotation of the outer bracket relative to the fourth member. Similarly to the inner bracket, the outer bracket has a securing portion or flange 87 having openings to receive the bolts 19 for clamping the clamp 20 around the item 11 to be held by the device. In FIG. 2, it can be seen that the fifth axis 86 is disposed within a plane which is parallel to a plane containing the first axis 45, both of the planes being normal to the second, third and fourth hinge axes. Clearly, the members could be arranged so that the axes 45 and 86 were coplanar, but this aspect is not necessary. Thus, the first anf fifth hinge axes are disposed normally to the second, third and fourth hinge means.

As best shown in FIGS. 1 and 2, members 22 and 23 have a flat portions 112a and 112b respectively, extending between the respective bosses 54 and 63, and 66 and 69. Flat portions 112a and 112b are parallel to but spaced from faces 56 of the bosses. The flat portions 112a and 112b have a width less than the diameter of faces 56 in order to facilitate alignment of the faces 56 during assembly of the device 10. The flat portion or longitudinal face 112a lies in a first plane. The flat portion or longitudinal face 112b lies in a second plane. The first and second planes are spaced from and parallel to each other, thereby providing maximum load connection and reduced torque condition between the surface mounting bracket and the item mounting bracket.

Bosses 48, 54, 63, 66, 69 and 73 have a frustoconical portion 114 merging into journal 116. Journal 116 has terminal end 118 which seats with nut and bolt assemblies 57. Reinforcing rib 120 is integral with and extends between journals 116 of members 22 and 23 in order to maximize the strength of members 22 and 23. Reinforcing ribs 120 have a terminal edge 122 which is spaced from terminal ends 118 and is parallel to portions 112. Consequently, members 22 and 23, which are, preferably, identical, are able to resist the torque applied thereto by the pulling force exerted on cable 12.

FIGS. 5 and 6

The device has similar second, third and fourth hinge means, and thus one hinge means interconnecting the first and second members, namely the second hinge means 61, will be described in detail. The annular face 56 of the boss 54 of the second member 22 has engaging means 91 which includes a plurality of radially disposed serrations 92 extending from positions adjacent the opening 55. The serrations 92 have a relief, that is a height 94 between adjacent crests and troughs which is sufficient to cooperate with a similar and complementary relieved engaging means 95 of the boss 48 of the adjacent first member which provides an interfitting relationship therewith. If the radially disposed serrations have an angular pitch 96 of about 5°, it can be seen that the angular relationship between the first and second members can be varied approximately 5° for each increment of relative rotation between the members. The second, third and fourth members have similar engaging means adjacent openings at appropriate ends thereof, the engaging means augmenting gripping of an adjacent member secured at the respective bore to essentially prevent rotation between the members when the hinge means is locked.

The interengaged serrations 92 lock the members 21, 22, 23 and 24 together and thereby prevent unintended rotation of the members about the respective hinge axes 59, 68 and 78. Furthermore, the longitudinal axes of the first and third members 21 and 23 lie in a first plane, while the longitudinal axes of the second and fourth members 22 and 24, respectively, lie in a second plane parallel to and closely adjacent the first plane for thereby providing maximum load connection and reduced torque condition. The longitudinal axes may be thought of as lines coincident with axes 45 and 86, respectfully. The closeness of the planes thereby substantially approximates the longitudinal axes of the members 21, 22, 23 and 24 lying in a single plane. The lock members 21, 22, 23 and 24 thereby substantially approximate a unitary link capable of withstanding the extreme forces to which it is subjected. Any tendency of the members 22 and 24 to pivot on there hinge axes is thereby substantially eliminated.

The reinforcing ribs 120 of the members 22 and 23 prevent unintended bending of the members. In this way, the unitary link provided by the locked members 21, 22, 23 and 24 is capable of withstanding the torgue generated by the shaft 12, even when shaft 72 is parallel to shaft 43 and separated by the combined length of members 22 and 23. The same is true when axis 86 is normal to axis 45. It can be seen, therefore, that the holding device 10 is capable of being utilized in almost innumerable positions approximating the hundreds of devices previously required.

The engaging means are shown to be the radially disposed serrations provided on generally plane annular faces. Clearly, the faces could be conical, although this would tend to reduce the ease of interchanging the components. Alternatively, means other than radially disposed serrations could be used as engaging means to augment the gripping between engaged faces of the adjacent members.

OPERATION

Normally the inner bracket 16 would be first bolted to the surface 13, namely the engine crankcase, gearbox wall, etc., and the pinch bolt means 39 and 83 and the nut and bolt assemblies on the second, third and fourth hinge means would be loosened. The outer bracket 17 is then located in its approximate location and the bolts of the first through fifth hinge means are tightened slightly so as to locate the outer bracket 17 approximately where desired. The item to be located can then be clamped onto the outer bracket, e.g. by the clamp 20, and the particular nuts and bolts of the hinge means can be adjusted as required to locate the item in the desired position, at least within the 5° incremental adjustments permitted by the three hinge means. Clearly, as the first and fifth hinge means of the pinch bolt structures do not have serrations, essentially continuous adjustment can be attained by rotating about the first and fifth axes of rotation.

I claim:

1. An adjustable holding device for holding an item in a desired location relative to a surface, said device having:
   (a) a surface mounting bracket for securing said device to the surface;
   (b) said surface mounting bracket including an adjustable shaft clamp;
   (c) a first member having a complementary first hinge means;
   (d) said first hinge means having a hinge face transverse to the axis of rotation of said first hinge means;
   (e) said first member including a first stub shaft extending at substantially right angles to the axis of rotation of said first hinge means and rotatably adjustably clamped by and adapted for 360° rotation relative to said adjustable shaft clamp;
   (f) a second member having integral spaced coplanar complementary first and second hinge means;
   (g) said second member first and second hinge means each having a face transverse to the axis of rotation of said first and second hinge means respectively and projecting in the same direction;
   (h) said second member complementary first hinge face connected to said first members hinge face in angularly adjustable lockable face to face relation;
   (i) a third member having integral spaced coplanar complementary second and third hinge means;
   (j) said third member second and third hinge means each having a face transverse to the axis of rotation of said second and third hinge means and projecting in the same direction;
   (k) said third member complementary second hinge face connected to said second member second hinge face in angularly adjustable lockable face to face relation;
   (l) a fourth member having a complementary third hinge means;
   (m) said fourth member third hinge means having a face transverse to the axis of rotation of said third hinge means;
   (n) said fourth member third hinge means face connected to said third member third hinge means face in angularly adjustable lockable face to face rotation;
   (o) said fourth member including an integral second stub shaft extending from said fourth member third hinge means and at substantially right angles to the axis of rotation of said fourth member third hinge means;
   (p) an item mounting bracket for securing an item thereto;
   (q) said item mounting bracket including clamp means integral therewith and rotatably adjustably secured to and adapted for 360° rotation relative to said second stub shaft;
   (r) said third member having a longitudinal face extending between the respective hinge faces and said longitudinal face lying in a first plane;
   (s) said second member having a longitudinal face extending between the respective hinge faces and said second member longitudinal face lying in a second plane;
   (t) said first and second planes being spaced from and parallel to each other for providing maximum load connection and reduced torque condition between said surface mounting bracket and said item mounting bracket; and
   (u) the axis of rotation of said first hinge means, said second hinge means and said third hinge means are parallel to each other whereby force applied to said item mounting bracket is transmitted to said surface mounting bracket in a direction normal to the parallel hinge axes.

2. The device as defined in claim 1, wherein:
   (a) each of said stub shafts including a recess proximate the associated hinge means so that the stub shaft has maximum circumferential clamping area for engagement with the associated clamp means.

3. The device as defined in claim 1, wherein:
   (a) each of said hinge means including a boss having an annular face; and,
   (b) a plurality of generally equiangularly disposed radially directed serrations being associated with each of said faces and permitting adjustment of said members about the associated hinge axes in preselected angular amounts.

4. The device as defined in claim 3, wherein:
   (a) at least two openings being disposed in said surface mounting bracket and adapted for receipt therein of securing means for securing said bracket to the surface; and,
   (b) one of said openings being generally circular and the other of said openings being generally oval.

5. The device as defined in claim 3, wherein:
   (a) said second and third members having reinforcing rib means extending between the associated bosses; and,
   (b) said reinforcing rib means being parallel to a flat portion extending substantially between said faces.

6. The device as defined in claim 5, wherein:
   (a) each of said bosses having a frusto-conical portion extending opposite to the associated face; and,
   (b) a journal merging to said frusto-conical portion and said reinforcing means extending between adjacent journals of a member.

7. The device as defined in claim 6, wherein:
   (a) each of said journals having an aperture therethrough and through the underlying portion of the associated boss;
   (b) said apertures of the connected members being coaxial; and,
   (c) a nut and bolt assembly having a portion thereof extending through the coaxial apertures and being sufficiently tightened to lock the connected members together.

8. An adjustable holding device for holding an item in a desired location relative to a surface and for transmitting forces exerted by the item at the location to the surface the device comprising:
   (a) a surface mounting bracket adapted to be fixed to the surface, said bracket having an adjustable shaft clamp;
   (b) a first member including a stub shaft portion received within said clamp, said shaft portion being rotatable 360° within said clamp, said shaft portion adapted to be adjustably clamped at a preselected position and said first member including a first hinge means having a hinge face transverse to the axis of rotation of said first hinge means;

(c) a second member having integral spaced coplanar complementary first and second hinge means, each hinge means having a face transverse to the axis of rotation of said first and second hinge means and the faces projecting in the same direction, said second member complementary first hinge face connected to said first member hinge face in angularly adjustable lockable face to face relation;

(d) a third member having integral spaced coplanar complementary second and third hinge means, said third member second and third hinge means each having a face transverse to the axis of rotation of said second and third hinge means and projecting in the same direction, said third member complementary second hinge face connected to said second member second hinge face in angularly adjustable lockable face to face relation;

(e) a fourth member having a complementary third hinge means, said third hinge means having a face transverse to the axis of rotation of said third hinge means, said fourth member third hinge means face being connected to said third member third hinge means face in angularly adjustable lockable face to face relation, said fourth member including an integral second stub shaft extending from said fourth member third hinge means at substantially right angles to the axis of rotation of said fourth member third hinge means;

(f) an item mounting bracket for securing an item thereto and including clamp means integral therewith and rotatably adjustably secured to said second stub shaft and rotatable 360° relative to said stub shaft;

(g) said third member having a longitudinal face extending between the respective hinge faces and said longitudinal face lying in a first plane, said second member having a second longitudinal face extending between the respective hinge faces and said second longitudinal face lying in a second plane, said first and second planes being spaced from and parallel to each other for providing maximum load connection and reduced torque condition between said surface mounting bracket and said item mounting bracket; and, (h) said axis of rotation of said first hinge means, said axis of rotation of said second hinge means and said axis of rotation of said third hinge means are parallel whereby forces applied to said item mounting bracket are transmitted to said surface mounting bracket in a direction normal to said parallel hinge axes.

* * * * *